Figure 1:
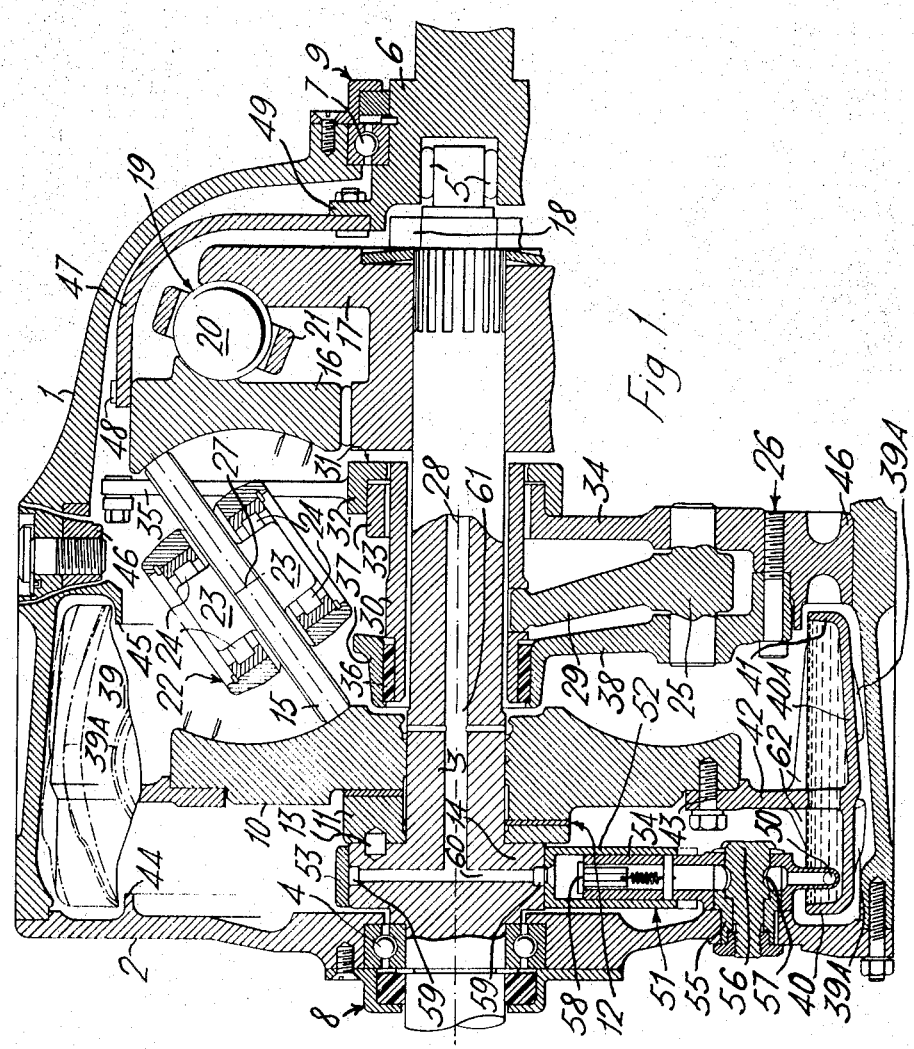

United States Patent
de Brie Perry

[15] 3,662,857
[45] May 16, 1972

[54] ROTARY SUMP WITH FLUID PICK-UP

[72] Inventor: Forbes George de Brie Perry, East Grinstead, England

[73] Assignee: National Research Development Corporation, London, England

[22] Filed: Nov. 24, 1969

[21] Appl. No.: 879,217

[30] Foreign Application Priority Data

Dec. 6, 1968   Great Britain......................58,217/68

[52] U.S. Cl..............................................184/6.2, 184/11
[51] Int. Cl......................................................F01m 11/06
[58] Field of Search .................184/6, 6 B, 11, 13, 6 U, 6 Y, 184/6.25; 74/710, 711

[56] References Cited

UNITED STATES PATENTS

| | | | |
|---|---|---|---|
| 2,872,875 | 2/1959 | Mergen et al. | 91/492 |
| 2,677,440 | 5/1954 | Willis | 184/6.25 X |
| 2,242,195 | 5/1941 | Teker et al. | 184/11 |
| 2,285,754 | 6/1942 | Money | 184/11 X |
| 3,065,822 | 11/1962 | McAfee | 184/6 |
| 3,097,546 | 7/1963 | Kelbel et al. | 184/6 X |
| 3,307,655 | 3/1967 | Hatz | 184/11 X |

*Primary Examiner*—Manuel A. Antonakas
*Attorney*—Larson, Taylor & Hinds

[57] ABSTRACT

The lubrication, cooling, etc., of a machine which cannot run flooded with fluid, or almost so, presents a problem when the machine is subject to changes of orientation, because the intake pipe of a fluid delivery pump or the like is starved except for one attitude of the machine when the pipe end is at the bottom. This problem is solved by the provision of a rotary sump in the form of an annular channel with inturned side walls.

The fluid pick-up dips into the body of fluid maintained in the channel by centrifugal force and may be connected to a pump inlet or may be self pressurizing by exploiting the ram effect.

The submerged end of the pick-up may be of hydrofoil section to counteract fluid starvation by the plowing of a channel in the fluid.

As far as possible, the channel surrounds rotary parts of the machine, to gather fluid flung off by them, the examples described being toroidal race rolling friction variable ratio transmission units. Rotating parts not so enclosed are surrounded parts of the casing, shaped to direct fluid towards the rotary sump.

The sump may be replenished from a fluid supply maintained at a predetermined pressure applied to a duct dipping into the fluid in the rotary sump to a depth where the centrifugal head of the fluid equals the predetermined pressure for chosen conditions of sump speed etc. If the sump level falls, the centrifugal head is insufficient to prevent fluid entering the sump through the replenishment duct. Otherwise the pressure at the duct outlet is either in balance or the centrifugal head exceeds the predetermined pressure. A closed-circuit assembly of machines is illustrated, having a driven machine running flooded with fluid with a scavenge pump providing the pressure for the replenishment duct of the rotary sump. A fluid cooler may be inserted in the circuit.

10 Claims, 4 Drawing Figures

Fig. 1.

ROTARY SUMP WITH FLUID PICK-UP

This invention relates to rotary machines comprising a casing the attitude of which is subject to change and a means for providing a sump from which fluid for lubrication and/or cooling and/or control can be drawn, and which is independent of the attitude of the casing.

In the case of the normal fluid circulation system in common use with machines which cannot be run completely filled with fluid, the reserve fluid collects in a sump from which it is drawn by a pump for lubricating, cooling or controlling the machine via a pick-up pipe dipping into the fluid in the sump, is ineffective when the machine changes attitude or is subjected to accelerations which cause the reserve fluid to collect in a part of the casing out of reach of the pick-up pipe.

The so-called "dry sump" system, where reserve fluid is collected in a separate vessel which can be maintained full of fluid, does not completely solve the problem because the lubrication, cooling or control system invariably allows the fluid to drain from or to be flung off the parts of the machine to which it is supplied; in the case of fluid used for control purposes, furthermore, it is generally necessary for fluid to be drained away into the machine casing when pressure is to be released from valves, actuators and the like. This fluid collecting in the casing has to be scavenged and delivered to the separate vessel and if the attitude of the casing is not constant the intake of the scavenge pump or the like is liable to be starved.

The invention provides, for solving this problem, a rotary sump in which an annular body of fluid is maintained by centrifugal force, with a pick-up penetrating into the said body of fluid which is substantially independent of the attitude of the casing of the machine and of the accelerations to which it may be subjected.

More particularly the invention provides a rotary machine comprising a casing, bearings in the casing, rotary parts of the machine within the casing being rotatable about a main axis defined by the said bearings, an annular channel-shaped member within the casing with side walls directed radially inward from a generally cylindrical floor portion, the said annular member being coupled to a rotating part of the machine to rotate about the main axis and pick-up means with an intake orifice penetrating between the side walls of the annular member, whereby, when the annular member is rotating, fluid for lubrication, cooling, controlling or the like, is collected in the channel thereof from which it may be extracted via the pick-up means without regard to the angular attitude of the casing.

The term "cylindrical" is used above in the broad sense of a body of revolution the generator of which is not necessarily a straight line.

Preferably the casing is so shaped that lubricant shed from rotating parts not enshrouded by the annular member is directed to parts of the casing surrounding the annular member.

The tubular pick-up member may be connected to the intake of a pump. Alternatively the pick-up member may be arranged so that pressure is built up within it by reason of the motion of fluid held within the annular member when it is rotated, so that the annular member and the pick-up member together form a pump.

Two embodiments of the invention are illustrated respectively in FIG. 1 and FIGS. 2, 3 and 4 of the accompanying drawings.

These embodiments were each designed as part of a variable ratio rolling friction device of the type in which at least one roller provides a driving connection between facing toroidal surfaces of an input disc and an output disc, which discs are mounted for rotation about a common main axis.

The invention is not confined to such an application, however.

The embodiment of FIG. 1 is suitable for the case where the machine casing is liable to take up any attitude around the main axis of the rotary items but where the main axis itself will not depart from a generally horizontal attitude, except perhaps momentarily.

A main casing 1 has an end-cover 2 which together provide an enclosure for the rotary and other parts to be described below.

An input shaft 3 is supported, at one end, in a ball bearing 4 in end-cover 2 and at the other end in a needle roller bearing 5 in a recess in an output shaft 6 which is in turn supported in a ball bearing 7 in the end wall of casing 1. Seals generally indicated at 8 and 9 are provided on the outsides of bearings 4 and 7.

A toroidally-surfaced input disc 10 is carried on shaft 3 with limited freedom to rotate thereon, restrained by a loading device comprising a ring 11 the right hand face of which is of cam shape, co-operating, through a washer 12 of low friction material, with a complementary cam shape formed on the left hand face of disc 10. Ring 11 is anchored to rotate with shaft 3 by means of a dowel pin 13 which enters aligned holes in ring 11 and an adjacent boss 14, integral with shaft 3. Relative rotation between disc 10 and ring 11 forces disc 10 to the right to load it against a roller 15 (one of three) the other side of which is in rolling engagement with the toroidal surface of an output disc 16.

A thrust plate 17 is secured to the end of shaft 3, in the vicinity of bearing 5, by a nut 18.

Plate 17 forms one race of a ball bearing, generally denoted 19, the other race being formed on the right hand face of output disc 16. The balls 20 are carried in a cage 21.

When input shaft 3 is rotated, the drive is transmitted to input disc 10 via ring 11, which turns to an extent dependent upon the torque transmitted and in doing so exerts a force proportional to this torque in an axial direction tending to force disc 10 to the right, and disc 16, through bearing 19, plate 17, shaft 3, boss 14, ring 11 and washer 12, to the left. This provides the normal loading upon roller 15 which is necessary to ensure driving engagement substantially without slip.

The rollers such as 15 are mounted in roller carriers such as 22 which define a rolling axis for each roller by means of spigots such as 23 on the roller and roller bearings such as 24 in the carrier. Each carrier extends beyond the margins of the roller in the direction normal to the plane of the paper in the case of roller 15. One end at least of each roller carrier is pivotally joined to the outer end of a rocker lever such as 25, pivotted in a spider assembly (generally indicated at 26) anchored to casing 1.

The rocker levers define a ratio-change axis for each roller, such axis in the case of roller 15 passing through the roller center 27 and being substantially normal to the plane of the paper.

The rocker-levers also enable the rollers to be held in or moved away from the stable rolling condition in which the rolling axis of the roller (as defined by bearings such as 24), intersects the main axis 28 about which shaft 3 rotates.

Each rocker lever has an inwardly extending limb 29 the tip of which is received in a slot in a sleeve 30 which is capable of a limited amount of free movement in any direction radial of axis 28 under the influence of the torque reaction forces applied from the rollers via the rocker levers and when these forces are unequal, due to inequality of the driving loads carried by the rollers, sleeve 30 moves radially, whereupon the rollers are shifted differentially from their equilibrium positions and differential ratio changes take place tending to bring the loads carried by the rollers to equality in the manner described in detail in U.K. Pat. Specification 979062.

To change the ratio of the transmission unit as a whole, sleeve 30 is rotated to displace the roller carriers (such as 22), in unison. This is effected, without interfering with the ability of sleeve 30 to move radially at the end engaged by arms, such as 29, of the rocker levers such as 25, by means of interengaging dogs, generally indicated at 31 on the right hand end of sleeve 30 and of a collar 32 which is pivotally carried on a ring 33 supported on inwardly extending spider limbs such as 34 of spider assembly 26. Collar 32 is rotated by means of a lever 35. Dogs 31 are barrelled and/or crowned to provide a universal coupling.

Radial motions of sleeve 30, in the course of load equalization as previously explained, are preferably damped to avoid oscillation, by means of a sock 36 which may consist of a toroidal sleeve of rubber or the like filled with a highly viscous fluid (e.g. silicone putty), held between the end of tube 30 and a ring 37 supported by inwardly extending limbs such as 38 of spider assembly 26.

Transmission systems of the type described where torque is transmitted through hard metal surfaces in rolling engagement are frequently described as "rolling friction" drives, but in fact the surfaces in question must always be separated by an extremely thin film of oil preferably of a special kind having high viscosity at high pressure. A liberal supply of such oil must at all times be available for cooling surfaces which are in rolling engagement and to ensure maintenance of the oil film and in cases where the attitude of the main casing cannot be predetermined, or is subject to change, the commonly used lubricant system in which the suction pipe of a pump dips into a sump in the casing, cannot be used because the intake end of the suction pipe will not always be at the bottom.

The invention provides a sump in which centrifugal force is substituted for gravity.

In the FIG. 1 embodiment this sump takes the form of a drum 39 with flanges or side-walls 40 and 41, extending inwardly from a generally cylindrical floor portion 40A, and a central inwardly extending web 42 which is attached to the outer left hand face of disc 10 by means of bolts such as 43.

Cylindrical lipped flanges one, 44 projecting from cover plate 2, and the other, 45 projecting from the main fixing ring 46 of spider assembly 26, lie radially within and overlap, axially, the flanges 40 and 41 of sump 39 so as to direct into the annular cavity defined by flanges 40 and 41 and floor portion 40A, any oil spilled from rotating parts of the transmission unit to the left of spider fixing ring 46. Oil spilled from other parts of the rotating assembly is inevitably collected within the casing which is given its greatest diameter where it encloses sump 39. This oil will therefore tend to collect in the region of the outside of sump 39 whichever way up the casing may be (so long as it is not tilted with the right hand end downwards and the left hand end upwards), but it will collect in the place which for the moment is at the bottom and will overflow the rims of flanges 40 and 41 and enter the sump space before any substantial quantity has collected.

Output disc 16 is coupled to output shaft 6 by means of a drum 47 the open rim of which is notched to receive castellations 48 projecting from disc 16 and the right hand end of which is rivetted to a flange 49 integral with output shaft 6. Drum 47 catches the oil spilled from bearing 19 and may be shaped so as to direct this oil by centrifugal force, towards the left hand end of casing 2.

When the transmission unit is not rotating, all the free oil within casing 2 drains down to whichever part of casing 2 is at the bottom and so long as axis 28 remains substantially horizontal this free oil will collect at the left hand end, immersing drum 39. When input shaft 3 is rotated, this oil is picked up by the inner cavity of sump 39 and carried around as a ring of oil maintained in position between flanges 40 and 41 by centrifugal force, until only a small residue remains in the casing outside sump 39. Oil which subsequently migrates to the part of the casing surrounding sump 39 is carried round and may be directed axially away from the central plane of sump 39 by "herringbone" ribs or grooves in the inner wall of the casing and/or the outer surface of sump 39, the latter being indicated in dotted lines at 39A. The axial momentum thus imparted to the oil will carry it around the outer surfaces of flanges 44 and 45 and thence into the inner cavity of sump 39.

The pick-up from the sump 39 consists of the intake pipe 50 of a pump (generally indicated at 51) which comprises a cylinder 52 integral with a strap 53 surrounding the eccentric outer surface of boss 14 of shaft 3. A piston 54 slides within cylinder 52 and rocks about an anchor pivot consisting of a sleeve 55 and an anchor bolt 56 grooved at 57 to permit oil to pass from intake pipe 50 up the central bore of piston 54 towards a spring-loaded non-return valve 58 which opens when cylinder 52 recedes (upwards in the drawing) to pass oil into the cylinder and closes when cylinder 52 moves towards piston 54, so that oil is expelled via a circumferential groove 59 and thence through ducts 60 and 61 to various parts of the transmission unit which require to be lubricated or cooled.

In some applications the pressure at intake pipe 50 due to the motion of the oil in sump 39 may be sufficient for lubrication and cooling purposes enabling the pumping action of piston 54 and cylinder 52 to be dispensed with. It still remains necessary to retain means for transferring oil from pipe 50 to rotary shaft 3. The strap 53 may be retained but boss 14, is machined concentric instead of eccentric. The pump components may be omitted and replaced by an extension of pipe 50 to join sleeve 53 but it may be convenient to leave these pumping components unchanged in the interests of standardization and interchangeability of parts.

The interior of sump 39 may be furnished with transverse webs such as 62 to ensure that the oil is efficiently carried round with sump 39, with a minimum of relative slip.

Figure 2:
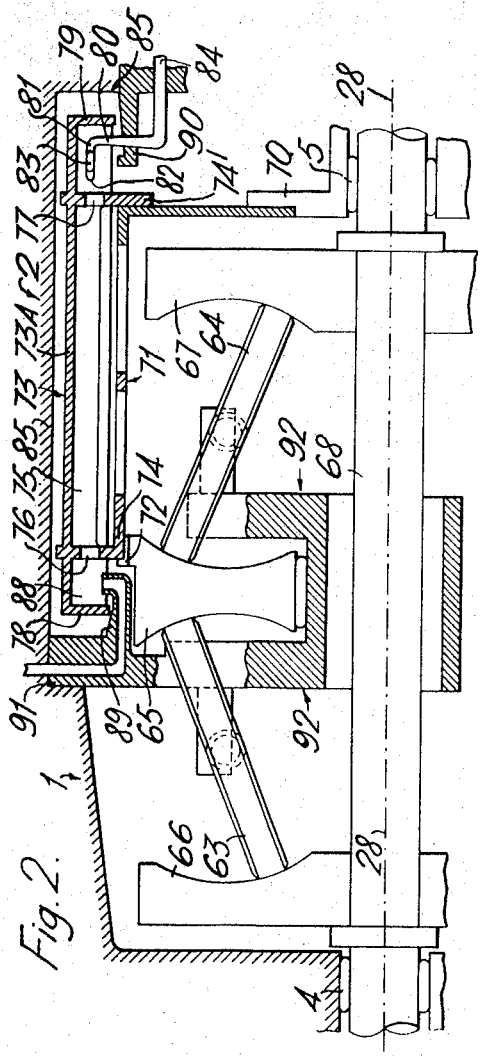
Figure 3:
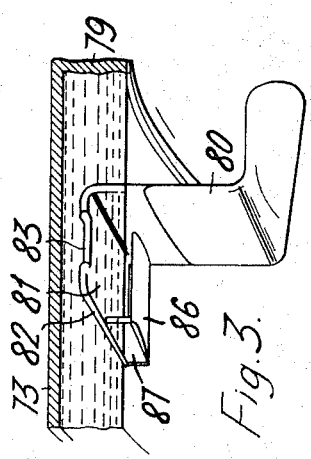
Figure 4:
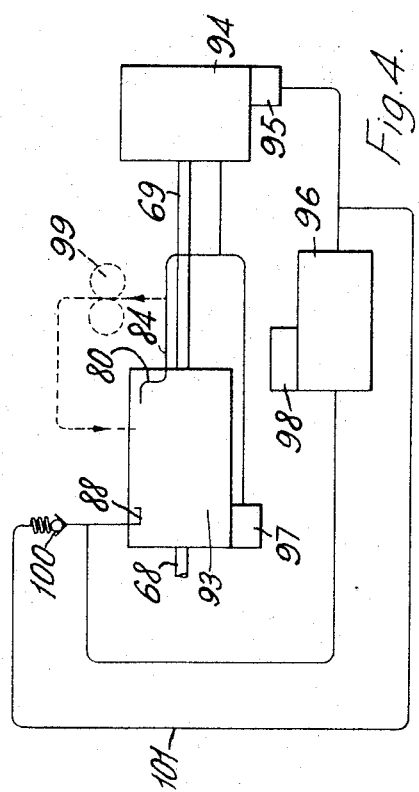

The embodiment now to be described in relation to FIGS. 2, 3 and 4 is particularly, though not exclusively, suitable for an application where the machine casing will generally have a predetermined attitude in relation to the earth's surface but must be capable of operation in many other attitudes for relatively short periods. The embodiment was in fact designed for a transmission system of the same general type as that illustrated in FIG. 1 for coupling an electric alternator to a propulsion engine of an aircraft required to have aerobatic capability.

FIG. 2, in which certain items, common to FIG. 2 and FIG. 1, have been given the same reference numerals as those used in FIG. 1, is a somewhat diagrammatic representation of a rolling friction toroidal disc transmission system having two sets of rollers such as 63 and 64, respectively coupling two opposite toroidal faces of a central disc 65 to two inwardly facing surfaces each on one of two outer discs 66 and 67 coupled to a common shaft 68 so that the two sets of rollers provide parallel transmission paths from the central disc 65 to the common shaft 68.

An output shaft 69 has a flange 70 to which is rivetted a bell 71, which extends over the set of rollers such as 64 and has notches at its open end (on the left in FIG. 2) ;which are engaged by dogs 72 extending outwardly from disc 65. The cylindrical section of bell 71 is extensively perforated both to reduce its weight and also to permit oil spilled from discs 65 and 67 and the set of rollers such as 64 to pass through into the rotary sump 73. This sump is similar to sump 39 of FIG. 1 but has a cylindrical floor portion 73A which is somewhat longer axially of shaft 68 and it has two fixing webs 74, 74' one of which is welded to the disc-like end portion of bell 71 and the other of which is welded to the open end of bell 71. These webs are perforated as at 76 and 77 to provide through communication between the cavity of the sump 73 between webs 74 and 74' and the cavities beyond these webs extending to the side walls 78 and 79 of sump 73. As in the case of the FIG. 1 embodiment, transverse webs, such as 75, may be provided to ensure that the oil is efficiently carried round with sump 73.

As one alternative construction, bell 71 may be omitted and its function performed by sump 73 suitably strengthened to transmit torque loads and with web 74 formed to engage dogs 72 on discs 65 and web 74' inwardly extended to meet and be secured to flange 70.

As another alternative construction the perforations in the cylindrical section of bell 71 may be omitted so as to close all access to the central portion of sump 73 except via holes 76 and 77. Oil flung on to the inner surface of the cylindrical section of bell 71 could escape via dogs 72 into the left hand end of sump 73 beyond web 74, bell 71 being shaped or provided with slanting ribs or slots to direct the coil to the left.

The pick-up tube in this embodiment is designed to act as a pump for which purpose, essentially, it need only present an entry orifice to the body of oil in the sump advancing towards it, for instance a radially extending pipe with its outer end cranked to lie circumferentially of the sump 73. At high speeds however, such a simple device rapidly ploughs an air-filled channel in the oil whereby the pick-up entry orifice is starved of oil. To solve this problem the pick-up tube in the vicinity of its intake orifice, must be of such hydrodynamic form as to cause its wake to close behind it and supplementary flaps or like devices may be needed to ensure that this happens.

The pick-up in the FIG. 2 embodiment has a flattened radially extending section 80 which is bent through a right angle, at a point radially outwardly of the inner rim of side wall 79, to provide a short section 81 which extends axially of the transmission unit, and penetrates into the sump cavity. The end of this section 81 is sealed at 82 but the edge which will first encounter the rotating body of oil in sump 73 is pierced by an intake orifice 83 leading to the interior of the pick-up tube, the free end of which 84, is led out of the transmission unit casing 85 in this particular embodiment, for purposes to be explained below.

FIG. 3 shows the pick-up tube to an enlarged scale. Section 81 is preferably of hydrofoil section oriented so as to direct oil radially inwards so as to counteract the forming of a furrow by section 81 in its passage through the oil. A supplementary hydrofoil 86 may be provided, similarly oriented to direct oil radially inwards in cases where the hydrofoil action of section 81 is not by itself sufficient to avoid starvation of orifice 83. The flat-sided section 80, supplemented by the web 87, which braces the outer end of hydrofoil 86, provide side walls inhibiting the spread of oil to either side of section 81 and web 87 may be extended as necessary to enhance this effect. The depth of the orifice 83 beyond the open surface of the oil in sump 73 is a matter of choice. The deeper it is the higher the static pressure or centrifugal head at the orifice 83 but also the greater the drag loss. As the sump 73 tends to centrifuge any dense solid matter outwards, the orifice must be inboard of any accumulations of such matter. At high speeds the dynamic factors may predominate in determining the pressure at orifice 83 so that the depth of immersion is determined solely by the need to ensure that the intake orifice meets oil and is not starved by the ploughing of an air-filled furrow.

The pressure available from the outlet pipe 84 may be used for a variety of hydraulic purposes such as the control of the ratio settings of the rollers such as 63 and 64, the lubrication of the transmission unit or the cooling of any auxiliary machinery which it is the purpose of the transmission unit to drive.

Where these utilization outlets are closed circuits, the fluid returning from them will be at some pressure derived from the pressure at orifice 83. But where at some point downstream of pipe 84 there is a free surface whereby the oil below the same is at ambient pressure a scavenge pump or the like will be required to return oil to sump 73 after its work is done.

It is a subsidiary feature of the invention to keep the sump 73 replenished by means which control this return flow.

The said means comprise a pipe 88 receiving the return flow, the open end of which penetrates within sump 73 to a level slightly beyond a predetermined intended surface level of the oil in sump 73. If this surface is assumed to be at atmospheric pressure then, when the sump is rotating, the pressure will rise, as the "depth" below the surface increases. The pressure at pipe 88 is maintained, for instance by a pressure relief valve discharging excess pressure to some convenient low pressure point in the hydraulic circuit, at a convenient level, say 10 lbs. per sq. in. If the open end of pipe 88 penetrates to a "depth" corresponding to 10 p.s.i. with the free surface of the oil at some arbitrarily chosen level, then if this level rises, the pressure into which pipe 88 is delivering will exceed the pressure available in pipe 88 and the inflow will be stopped. All the time oil is being drawn off through orifice 83 so that the level of oil in the sump will "fall" again and oil flow through pipe 88 will be resumed. This pre-supposes that the pressure available in pipe 88 will not exceed 10 p.s.i. Should it for any reason exceed this value (or any other predetermined value) oil will flow into the sump until the level rises, increasing the depth of penetration of the end of pipe 88 "below" the surface and increasing the pressure facing pipe 88 and throttling the flow. As the pressures, at various "depths" below the surface, vary as the square of the speed, an increase of speed raises the pressure at the outlet orifice of pipe 88 and flow is stopped, only to be resumed when the level of oil in the rotary sump has "fallen below" its equilibrium level obtaining at the lower speed. The level cannot "fall below" the outlet orifice of pipe 88, however high the speed, because the pressure at that orifice would then drop to atmospheric pressure, thus permitting replenishment oil to flow. If the oil level rises too much the sump walls 78 and 79 will become awash and oil will spill out of the sump to be collected, along with any other oil feeds into the casing for lubrication etc. by oil-catching rings 89 and 90, the former being formed integral with the outer rim 91 of the roller mounting spider assembly generally indicated at 92, and the latter being integral with or attached to the casing. Rings 89 and 90 return oil to the sump 73 at those points of the rings 89 and 90, which are for the moment lowermost.

FIG. 4 shows, diagrammatically, an hydraulic circuit incorporating the arrangement of FIGS. 2 and 3.

The transmission unit 93, drives an auxiliary machine 94 via shaft 69, being itself driven at shaft 68 by an engine not shown.

Outlet pipe 84 delivers oil to the machine 94 for cooling and lubrication thereof. A scavenge pump 95 collects oil from the machine 94 and delivers it to a cooler 96 wherefrom it passes back to the pipe 88 in transmission unit 93. A pressure relief valve 100 opens to bleed oil away via pipe 101 when the pressure at pipe 84 exceeds a predetermined value, say 10 p.s.i., so as to maintain this pressure at point 84.

Any oil shed by rotating parts at the left hand end of transmission unit 93 (as seen in FIG. 2) will collect in the conical section 1 of the casing and will be directed by gravity to the right hand end and into the sump 73, in the same manner as is described in relation to FIG. 1, so long as the main axis of the transmission unit remains more or less horizontal. Should it be tilted downwards at the left hand end however (in a prolonged climb with an aircraft installation, for instance) too much oil may collect at this end of the casing. Where this possibility exists a scavenge pump 97 may be installed, to draw oil from the left hand end casing 85 and deliver it into the pipe leading from pipe 84 to machine 94. If scavenge pump 97 draws air this does not matter greatly and it will not permit reverse flow from pipe 84 to the left hand end of casing 85.

The circuit of FIG. 4 is a closed circuit system but the cooler 96 has an expansion tank 98 which is pressurized by air, trapped at atmospheric pressure during the filling of the system, which tries to expand at the higher operating temperatures. Expansion tank 98 is of a type which is independent of the attitude of cooler 96, using a diaphragm to separate air from oil.

It may be that relatively high hydraulic pressures are required for the ratio control system for transmission unit 93. This is frequently the case where the rollers are positioned by individual hydraulic rams which receive and oppose the torque reaction forces from the rollers, since space is limited in the region of the roller supports which precludes the use of large diameter rams. To provide these high pressures an auxiliary high pressure pump 99 may be required. It is an advantage for this pump to draw from a pressurized source and its input is therefore connected to pipe 84.

A rotary sump according to the invention has the additional virtue of centrifuging the oil whereby dense particulate matter collects at the outside and air is forced inwardly towards the free surface where a froth may form. Both orifice 83 and the end of pipe 88 will penetrate "below" this froth layer.

I claim:

1. A rotary machine comprising a casing, bearings in the casing, rotary parts of the machine within the casing being rotatable about a main axis defined by the said bearings, an annular channel-shaped member within the casing with side walls directed radially inward from a generally cylindrical floor portion, the said annular member being coupled to a rotating part of the machine to rotate about the said main axis and pick-up means having an intake orifice penetrating between the side walls of the annular member, whereby, when the annular member is rotating, fluid for lubrication cooling or the like, is collected in the channel thereof from which it may be extracted via the pick-up means without regard to the angular attitude of the casing, the annular member surrounding at least some of the rotating parts within the casing so as to collect fluid shed by such surrounded rotating parts, the outer surface of the annular member having ribs slanted with respect to the main axis whereby, when the annular member rotates, fluid outside it is accelerated in directions having a component parallel to the main axis, the inner surface of the casing being directed radially inward beyond at least one of the side walls of the annular member to convert the said axial component of motion of the fluid into radially inward motion.

2. A machine as claimed in claim 1 in which the said inner surface of the casing beyond the side wall of the annular member, is extended axially towards the center of the annular member, such extension being of generally cylindrical form and extending axially inwards past, and spaced from, the inner edge of the adjacent side wall of the annular member, whereby fluid from beyond the annular member will fall from the free edge of the said extension into the channel of the annular member.

3. A rotary machine comprising a casing, bearings in the casing, rotary parts of the machine within the casing being rotatable about a main axis defined by the said bearings, an annular channel-shaped member within the casing with side walls directed radially inward from a generally cylindrical floor portion, the said annular member being coupled to a rotating part of the machine to rotate about the said main axis and pick-up means having an intake orifice penetrating between the side walls of the annular member, whereby when the annular member is rotating, fluid for lubrication cooling or the like, is collected in the channel thereof from which it may be extracted via the pick-up means without regard to the angular attitude of the casing, the annular member surrounding at least some of the rotating parts within the casing so as to collect fluid shed by such surrounded rotating parts, means being provided for replenishing the annular member with fluid, such means comprising fluid pressurizing means with an output duct having a terminal orifice between the side walls of the annular member, the output duct extending towards the inner surface of the floor portion of the annular member with the terminal orifice at a predetermined distance radially outwards from the inner rims of the said side walls, with means for regulating the pressure of the fluid delivered by the pressurizing means to the output duct, to maintain a predetermined pressure at the terminal orifice of the output duct whereby fluid only flows into the annular member when the centrifugal head of the fluid in the annular member at the level of the terminal orifice is less than the said predetermined pressure.

4. A machine as claimed in claim 4 in which the rotating parts comprise a toroidal race rolling friction variable ratio transmission unit with an input shaft adapted for connection to a prime-mover and an output shaft connected to a driven machine adapted to operate substantially filled with fluid, the fluid pressurizing means comprising a scavenge pump for drawing fluid from the driven machine and delivering the same to the said terminal orifice, a connection being provided from the pick-up means, which penetrates between the side walls of the annular member, to the driven machine, for conveying fluid to the driven machine along such connection.

5. A machine as claimed in claim 4 with a fluid cooler in the fluid path between the driven machine and the said terminal orifice.

6. A rotary machine comprising a casing, bearings in the casing, rotary parts of the machine within the casing being rotatable about a main axis defined by the said bearings, an annular channel-shaped member within the casing with side walls directed radially inward from a generally cylindrical floor portion, the said annular member being coupled to a rotating part of the machine to rotate about the said main axis and pick-up means having an intake orifice penetrating between the side walls of the annular member, whereby, when the annular member is rotating, fluid for lubrication cooling or the like, is collected in the channel thereof from which it may be extracted via the pick-up means without regard to the angular attitude of the casing, the annular member surrounding at least some of the rotating parts within the casing so as to collect fluid shed by such surrounded rotating parts, the pick-up means being an oval-sectioned tube with a central section running radially of the main axis, with the major axis of the oval section in a plane normal to the main axis, the central section, at its end nearest to the main axis, having a support section fixed to the casing to support the central section in a position penetrating between the side walls of the annular member and, radially outwards of the inner margins of these side walls and at the end of the central section nearest to the inner surface of the cylindrical part of the annular member, the central section is bent to provide a pick-up section running parallel to the main axis and with an intake orifice in the pick-up section, so located that motion of fluid in the annular member past the pick-up section, gives rise to a pressure above ambient pressure at the intake orifice.

7. A machine as claimed in claim 6 in which the pick-up section of the pick-up means is of hydrofoil cross-section with its major plane substantially circumferential of the main axis and oriented to impart a radially inward motion to fluid in the annular member when the latter is rotated.

8. A machine as claimed in claim 7 in which the pick-up section of the pick-up means is equipped with fences oriented to impart motion, parallel to the main axis and inwardly towards the middle of the pick-up section, to fluid in the annular member when the latter is rotated.

9. A machine as claimed in claim 7 in which the intake orifice of the pick-up section of the pick-up means is a slot extending along central parts of the leading edge of the hydrofoil section.

10. A machine as claimed in claim 7 with a supplementary hydrofoil surface attached to the pick-up means and oriented to impart radially inward motion to fluid in the annular member when the latter is rotated whereby starvation of the intake orifice, by information of a channel in the fluid on passage past the pick-up section, is counteracted.

* * * * *